(12) United States Patent
Amano et al.

(10) Patent No.: US 7,354,882 B2
(45) Date of Patent: Apr. 8, 2008

(54) CARBON MONOXIDE REMOVING CATALYST AND PRODUCTION PROCESS FOR THE SAME AS WELL AS CARBON MONOXIDE REMOVING APPARATUS

(75) Inventors: Takashi Amano, Nagoya (JP); Atsushi Takumi, Nagoya (JP); Shugou Zhang, Sakai (JP); Hiroshi Tabata, Yokohama (JP)

(73) Assignees: Aisin Seiki Kabushiki Kaisha, Kariya-shi (JP); Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 11/346,449

(22) Filed: Feb. 3, 2006

(65) Prior Publication Data

US 2006/0160697 A1   Jul. 20, 2006

Related U.S. Application Data

(63) Continuation of application No. PCT/JP2005/006451, filed on Mar. 25, 2005.

(30) Foreign Application Priority Data

Apr. 1, 2004   (JP) .............................. 2004-109325

(51) Int. Cl.
  *B01J 23/40*  (2006.01)
  *B01J 23/42*  (2006.01)
  *B01J 23/00*  (2006.01)

(52) U.S. Cl. ....................................... 502/326; 502/349

(58) Field of Classification Search ................ 502/326, 502/333, 334, 339, 349, 439
See application file for complete search history.

(56) References Cited

U.S. PATENT DOCUMENTS 4,904,633 A * 2/1990 Ohata et al. ................. 502/304
5,502,019 A * 3/1996 Augustine et al. ........... 502/314
6,069,111 A * 5/2000 Yamamoto et al. ......... 502/333
6,235,677 B1 * 5/2001 Manzer et al. .............. 502/232
6,855,661 B2 * 2/2005 Kim ............................ 502/219
6,933,259 B2 * 8/2005 Hatanaka et al. ........... 502/240

FOREIGN PATENT DOCUMENTS

CN    1171748 A    1/1998

(Continued)

OTHER PUBLICATIONS

"R&D Report for FY 1997 Proposal-Based R&D Program of New Energy and Industrial Technology Development Organization" with English explanation.

*Primary Examiner*—Cam N. Nguyen
(74) *Attorney, Agent, or Firm*—Oblon, Spivak, McClelland, Maier & Neustadt, P.C.

(57) ABSTRACT

A carbon monoxide removing catalyst whose catalytic activity is higher than conventional carbon-monoxide-methanation-reaction catalyst comprising an oxide support containing an oxide containing Co and Zr, and a Ru, Pt, Rh and/or Pd noble metal catalyst loaded on the oxide support, capable of removing carbon monoxide by means of carbon monoxide methanation reaction. The carbon monoxide removing catalyst has higher catalytic activity with respect to carbon monoxide methanation at low temperatures, compared with carbon monoxide removing catalysts which use oxides of Zr—Fe, Zr—Mn, and the like, or zirconia, as the support. A number-of-atom ratio of Co/Zr can be 1/3 or more and 3/1 or less.

3 Claims, 1 Drawing Sheet

FOREIGN PATENT DOCUMENTS

| | | |
|---|---|---|
| JP | 62-036004 | 2/1987 |
| JP | 07-048101 | 2/1995 |
| JP | 10-029804 | 2/1998 |
| JP | 2001-149781 | 6/2001 |
| JP | 2002-066321 | 3/2002 |
| JP | 2002-068707 | 3/2002 |
| JP | 2003-320254 | 11/2003 |
| JP | 2004-049961 | 2/2004 |
| JP | 2004-097859 | 4/2004 |
| JP | 3593358 | 9/2004 |
| WO | WO 96/20787 | 7/1996 |

\* cited by examiner

CARBON MONOXIDE REMOVING CATALYST AND PRODUCTION PROCESS FOR THE SAME AS WELL AS CARBON MONOXIDE REMOVING APPARATUS

This is a continuation of PCT application PCT/JP2005/006451 filed Mar. 25, 2005, which in turn is based on Japanese application 2004-109325 filed Apr. 1, 2004, the entire contents of each of which is incorporated herein by reference.

TECHNICAL FIELD

The present invention relates to a carbon monoxide removing catalyst and a carbon monoxide removing apparatus, which can remove carbon monoxide contained in hydrogen, a fuel for fuel cell, more particularly it relates to a carbon monoxide removing catalyst and a carbon monoxide removing apparatus, which can remove carbon monoxide by means of carbon monoxide methanation reaction.

BACKGROUND ART

Since hydrogen-oxygen fuel cells can retrieve energy more efficiently, compared with internal combustion engines, the studies have been actively under way currently. Here, hydrogen, a fuel for fuel cell, is synthesized by steam reforming natural gases, methanol, and the like, and by the subsequent carbon monoxide shift reaction. Since carbon monoxide, a poisoning substance to fuel-cell electrodes, is contained in a trace amount in the obtained hydrogen, the removal of the impurity, carbon monoxide, in the reformed hydrogen has been required (10-50 ppm). As for a method of removing carbon monoxide, a method of removing it by oxidizing it, a method of separating hydrogen by means of membrane reactor, a method of removing it by hydrogenating it to methane, and so forth, are available.

Among the methods of removing carbon monoxide, one which becomes the main stream is a method of adding oxygen into reformed gases and removing it as carbon dioxide by oxidation. In this method, oxygen is added in order to remove carbon monoxide efficiently. Accordingly, the oxidation of hydrogen develops simultaneously with the oxidation of carbon monoxide so that not only hydrogen has been consumed wastefully but also it has become difficult to control the heat-generation by means of combustion reaction and to control the adding oxygen amount.

On the other hand, in the case of employing a membrane reactor, pressurized heat application is needed when collecting hydrogen with a membrane so that the complication of system is inevitable. Moreover, since hydrogen cannot be collected by 100%, the direct loss of hydrogen has taken place as well.

Since the removal method by means of reaction (methanation reaction) which hydrogenates carbon monoxide, included in a trace amount in hydrogen, is such that, contrary to the oxidation removal method, it is not necessary to newly add oxygen, and the like, a possibility of simplifying the system is available.

As for a conventional removal method of carbon monoxide by means of methanation reaction, there is disclosed a removal method of trace-amount oxidized carbons in a hydrogen-rich gas, removal method in which oxidized carbons are reacted with hydrogen using a cobalt oxide catalyst at a methanation-reactor inlet temperature of about 120-250° C. (Patent Literature No. 1: Japanese Unexamined Patent Publication (KOKAI) No. 62-36,004). And, it is possible to name a removal method of carbon monoxide in a hydrogen-containing gas, which methanates carbon monoxide, making use of a catalyst in which a ruthenium compound and an alkali metal compound and/or an alkaline-earth metal compound are loaded on a refractory inorganic oxide support (Patent Literature No. 2: Japanese Unexamined Patent Publication (KOKAI) No. 2002-68,707). Moreover, it is possible to name a removal method by means of carbon monoxide methanation using a carbon monoxide removing catalyst in a hydrogen-containing gas, carbon monoxide removing catalyst which is completed by drying and reducing, without carrying out calcination, after loading a nitrate of ruthenium on a refractory inorganic oxide support (Patent Literature No. 3: Japanese Unexamined Patent Publication No. 2002-66,321).

Moreover, there is a description on a possibility of achieving a carbon monoxide methanation catalyst in which a Co metal and an Ru metal are loaded on an inorganic support including an oxide of Zr. In the examples, a catalyst in which an Ru metal is loaded on zirconia, an oxide of Zr, and a catalyst in which a cobalt metal is loaded on silica are disclosed separately (Patent Publication No. 4: Japanese Unexamined Patent Publication (KOKAI) No. 2004-97,859).

Further, there is disclosed a technology of removing carbon monoxide based on a general carbon monoxide selective oxidation method (Patent Publication No. 5: Patent Publication No. 3,593,358).

DISCLOSURE OF THE INVENTION

By the way, a catalyst of methanation reaction contributes to various reactions, and often acts as a catalyst even in the methanation reaction of carbon dioxide. Since carbon dioxide is a byproduct in reforming reaction, it is contained more abundantly than carbon monoxide so that the loss of hydrogen enlarges when its methanation reaction develops.

When comparing the respective methanation reactions of carbon monoxide and carbon dioxide, since the methanation reaction of carbon monoxide is more predominant at low temperatures than that of carbon dioxide, it is possible to make the carbon monoxide methanation reaction a main reaction by controlling the reaction temperature.

In other words, in order to efficiently develop the methanation reaction of carbon monoxide, it is desired to further improve the reaction rate of the methanation reaction of carbon monoxide at low temperatures. Moreover, since the methanation reaction is an exothermic reaction, it is desirable to keep the reaction temperature low in order to inhibit unexpected thermal runaway, and the like. Further, even without taking the methanation reaction of carbon dioxide into consideration, when the catalytic activity at low temperatures is enhanced, the catalyst amount is decreased so that it is possible to intend the effective utilization of resource.

The present invention is one which is done in view of the aforementioned circumstances, and it is therefore an assignment to be solved to provide a carbon monoxide removing catalyst whose catalytic activity is higher than those of conventional catalysts for carbon monoxide methanation reaction, and a production process for the same. Further, it is an assignment to be solved to provide a carbon monoxide removing apparatus which uses a carbon monoxide removing catalyst with a higher activity.

For the purpose of solving the aforementioned assignments, the present inventors had been carried out earnest studies, as a result, it was found out that a catalyst, in which a noble metal catalyst is loaded on an oxide support containing Co and Zr, has a high catalytic activity with respect to the carbon monoxide methanation reaction.

A carbon monoxide removing catalyst of the present invention, which is completed based on the aforementioned knowledge, is characterized in that it comprises:

an oxide support composed of an oxide containing Co and Zr; and a noble metal catalyst selected from the group consisting of Ru, Pt, Rh and Pd, and loaded on the oxide support; and it can remove carbon monoxide by means of carbon monoxide methanation reaction.

Here, it is preferable that said oxide support contains Co and Zr. And, the lower limit value of a number-of-atom ratio (Co/Zr) of Co to Zr is such that it is possible to name 1/100 or more, more than 1/100, 1/20 or more, more than 1/20, 1/3 or more, more than 1/3, 2/3 or more, more than 2/3, 4/3 or more, and more than 4/3. Moreover, the upper limit value of a number-of-atom ratio (Co/Zr) of Co to Zr is such that it is possible to name 1/0.01 or less, less than 1/0.01, 1/0.05 or less, less than 1/0.05, 1/0.1 or less, less than 1/0.1, 3/1 or less, less than 3/1, 2/1 or less, and less than 2/1. These lower limit values and upper limit values are combinable arbitrarily. When exemplifying some of the preferable ranges, it is preferable that a number-of-atom ratio (Co/Zr) of Co to Zr can fall in a range of 1/20 or more and 1/0.05 or less, it can more preferably be 1/3 or more and 3/1 or less, and it can especially preferably be 4/3 or more and 2/1 or less. Further, it is preferable that a number-of-atom ratio (Co/Zr) of Co to Zr can be 2/1, or 4/3.

It is desirable that said noble metal catalyst can be such that the content is 1% by mass or more and 5% by mass or less based on the total amount of said oxide support and said noble metal catalyst. And, it is desirable that said noble metal can be Ru.

The oxide support containing Co and Zr is not limited in particular in view of its preparation method, however, can be synthesized by a coprecipitation method (a method in which a solution containing a Co salt and a solution containing a Zr salt are mixed and Co and Zr are precipitated simultaneously utilizing a precipitant), a method of calcining after impregnation (a method in which a Zr-containing material is calcined after it is impregnated with Co), a sol-gel method (a method in which a solution which contains Co and Zr is prepared and the solution is turned into a gel), an ion injection method (a method in which Co is ion-injected into $ZrO_2$ or Zr is ion-injected into CoO contrarily), a solid phase reaction method (a method in which a Co-containing substance and a Zr-containing substance are reacted as they are solid), a hydrothermal synthesis method, and the like. As for the material of Co, it is possible to suitably make use of cobalt nitrate, cobalt chloride, cobalt oxalate, and so forth. As for the material of Zr, it is possible to make use of oxyzirconium nitrate, oxyzirconium chloride, zirconium oxide, and the like. Moreover, said oxide support can preferably be one which is producible by a step of heating an aqueous solution containing Co nitrate and zirconium nitrate while adding it into an alkaline aqueous solution.

Further, it can preferably be one which is producible by a production process comprising a step of immersing said oxide support into a solution containing a salt of said noble metal catalyst; and a step of reducing said noble metal catalyst into a metallic state after the immersion.

(2) A production process of the present invention for a carbon monoxide removing catalyst is a production process for a carbon monoxide removing catalyst capable of removing carbon monoxide by means of carbon monoxide methanation reaction, and is characterized in that it comprises: a precursor adhesion step of adhering a precursor of a noble metal catalyst selected from the group consisting of Ru, Pt, Rh and Pd onto said oxide support; and a reduction step of reducing said precursor into a metallic state.

Here, a number-of-atom ratio (Co/Zr) of Co to Zr is such that the numeric ranges, described in above (1), can be employed as preferable ranges.

(3) Further, a carbon monoxide removing apparatus of the present invention which solves the aforementioned assignment is characterized in that it comprises: the aforementioned carbon monoxide removing catalyst, or a carbon monoxide removing catalyst obtained by the aforementioned production process; and it can remove carbon monoxide, being contained in a hydrogen gas, by means of carbon monoxide methanation reaction.

And, for the purpose of suppressing side reactions, it is desirable that it can comprise temperature controlling means for controlling a temperature of said hydrogen gas, being introduced into said carbon monoxide removing catalyst, to 200° C. or less. In particular, it is desirable to control the temperature of said hydrogen oxide to 175° C. or less.

The carbon monoxide removing catalyst of the present invention, and a carbon monoxide removing catalyst obtained by the production process of the present invention are such that, as described later in examples and the like, an effect that, compared with the carbon monoxide removing catalysts which use the oxides of Zr—Fe, Zr—Mn and so forth as the support or which use zirconia for the support, the catalytic activity with respect to the carbon monoxide methanation reaction is high is available. Therefore, the carbon monoxide removal performance of apparatuses or methods which use those carbon monoxide removing catalysts is high as well.

Note that the carbon monoxide removing catalyst of the present invention often has a catalytic activity to the carbon monoxide shift reaction as well, in addition to the carbon monoxide methanation reaction. The carbon monoxide shift reaction is a reaction in which water reacts with carbon monoxide to generate carbon dioxide and hydrogen, and is a preferable reaction along with the methanation reaction in view of being capable of removing harmful carbon monoxide. Moreover, as a result of the carbon methanation reaction, since methane and water generate, the carbon monoxide shift reaction, which utilizes the generated water, develops as well.

BEST MODE FOR CARRYING OUT THE INVENTION

Carbon Monoxide Removing Catalyst: First Mode

Figure 1:
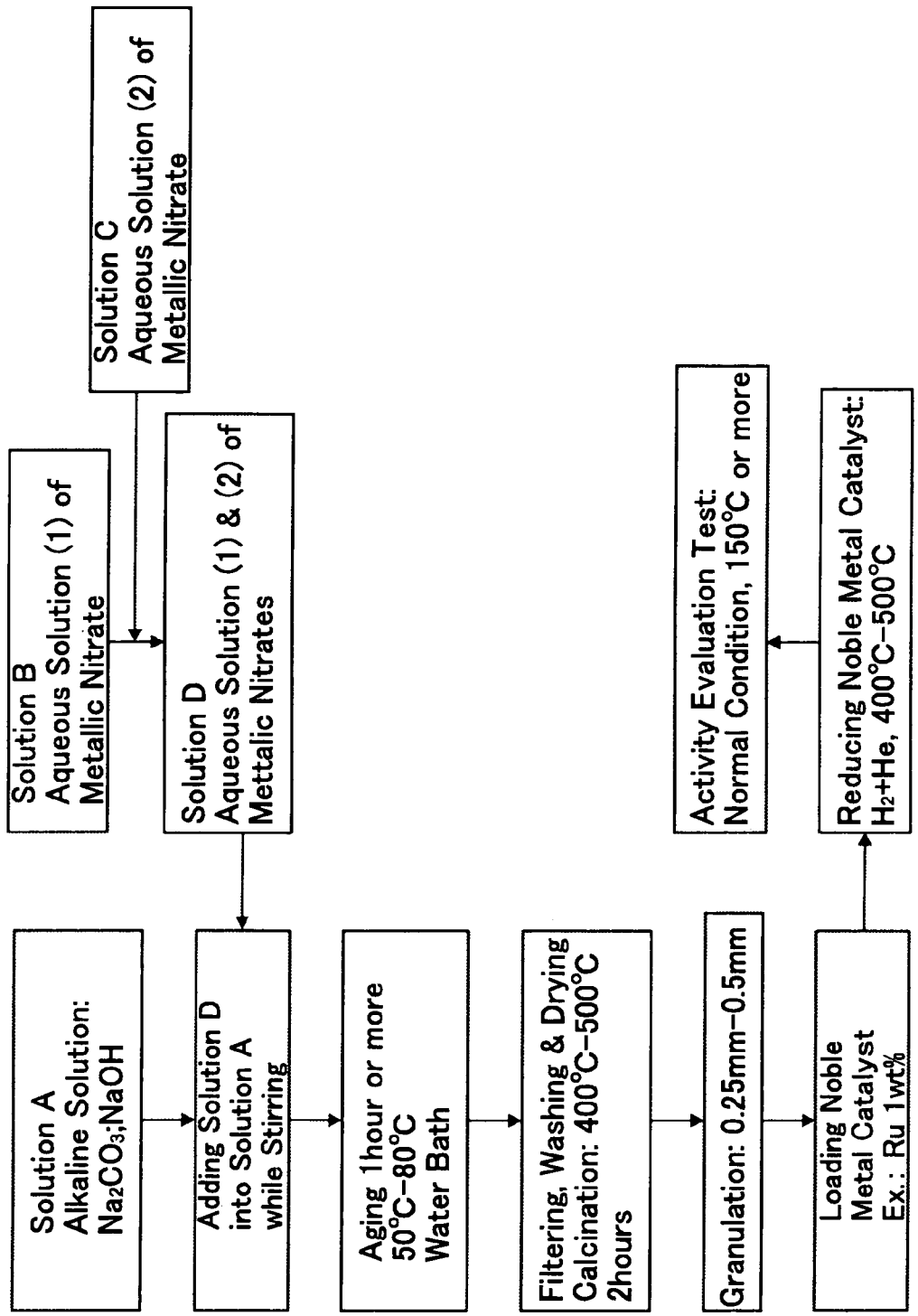
FIG. 1 is a flowchart for illustrating a production process of catalysts in examples.

A carbon monoxide removing catalyst of the present embodiment mode comprises an oxide support, and a noble metal catalyst loaded on the oxide support. It is possible to use the present catalyst in such a form as being granulated, or being coated on a honeycomb support.

The oxide support can preferably contain Co and Zr. And, the lower limit value of a number-of-atom ratio (Co/Zr) of Co to Zr is such that it is possible to name 1/100 or more, more than 1/100, 1/20 or more, more than 1/20, 1/3 or more, more than 1/3, 2/3 or more, more than 2/3, 4/3 or more, and more than 4/3. Moreover, the upper limit value of a number-of-atom ratio (Co/Zr) of Co to Zr is such that it is possible to name 1/0.01 or less, less than 1/0.01, 1/0.05 or less, less than 1/0.05, 1/0.1 or less, less than 1/0.1, 3/1 or less, less than 3/1, 2/1 or less, and less than 2/1. These lower limit values and upper limit values are combinable arbitrarily. When exemplifying some of the preferable ranges, it is preferable that a number-of-atom ratio (Co/Zr) of Co to Zr can fall in a range of 1/20 or more and 1/0.05 or less, it can more preferably be 1/3 or more and 3/1 or less, and it can especially preferably be 4/3 or more and 2/1 or less. Further, it is preferable that a number-of-atom ratio (Co/Zr) of Co to Zr can be 2/1, or 4/3.

It is not limited whether it contains an element other than Co and Zr, however, it is preferable to adapt an oxide of Co and Zr to a major component, it is further preferable to adapt an oxide of Co and Zr to 70% by mass or more of the support's mass, and it is furthermore preferable to be constituted of an oxide of Co and Zr. In the oxide support, Co and Zr can be present as a composite oxide, can be a simple mixture of their respective oxides, or can further be a mixture of both of them. This oxide support can preferably be one, which is in a form being producible by a step of heating an aqueous solution containing Co and zirconium nitrate while adding it into an alkaline aqueous solution. The Co nitrate and zirconium nitrate are such that, when heating them in the presence of alkali, the precipitates of the oxides generate.

As for a form of the oxide support, it is not limited in particular. For example, it is possible to name forms whose specific surface area is large, such as powders (those in which crystalline particles are separated, secondary particles or agglomerates such as granulated powders, and the like), and agglomerates composed of those powders. The powders can preferably be such that the particle diameters are 5 nm-500 μm approximately, and 5 nm-300 μm approximately can be further preferable. The agglomerates can be made by sintering or mechanical compression, and by sintering after compression. Moreover, by coating/drying/calcining those powders on a honeycomb substrate made of metal or ceramic after turning them into a slurry, it is possible to obtain the oxide support on which they are applied on the honeycomb substrate.

The noble metal oxide is selected from the group consisting of Ru, Pt, Rh and Pd. It has been revealed that, by employing Ru, Pt, Rh and Pd as the noble metal catalyst, the catalytic activity in the carbon monoxide methanation reaction improves, though the details are not specified herein. From the viewpoint of the relationship between the catalytic activity in the carbon monoxide methanation reaction and the catalytic activity in the carbon monoxide shift reaction, Ru and Rh are preferable, and Ru is particularly preferable. In addition to the fact that the noble metal catalyst can use the aforementioned elements independently, alternatively it can use them as an alloy or a mixture, the other elements (for example, transition elements, alkali metal elements or alkaline-earth metal elements) can be alloyed or mixed to use. Moreover, when a plurality of the noble metal catalysts (involving the case of containing catalytic components other than the noble metal catalyst) are loaded on the oxide support, it is possible to mix them after loading the respective catalytic components on separate or independent oxide supports.

As for a method of loading the noble metal catalyst on the oxide support, it is not limited in particular. For example, by reducing oxide, nitrate, chloride, and the like, of Ru, Pt, Rh or Pd to the noble metal catalyst after immersing the oxide support into a solution of it, it is possible to load the noble metal catalyst on the oxide support. The loading amount of the noble metal catalyst is not limited in particular, however, can be from 0.1% by mass to 50% by mass (based on the total amount of the oxide support and noble metal catalyst) approximately, can more preferably be from 0.5% by mass to 20% by mass approximately. Further, it can desirably be 1% by mass or more. By adapting it to this range, not only a sufficient catalytic activity can be obtained as an absolute value, but also the catalytic activity of the noble metal catalyst per unit mass can be adapted to sufficient one. Moreover, when the loading amount of the noble metal catalyst is adapted to 5% by mass or less, not only it becomes possible to suppress a side reaction (the methanation reaction of carbon dioxide), but also it is possible to adapt the temperature for processing hydrogen gas to an adequate range. For instance, as for the hydrogen-gas processing temperature, when it is adapted so that it becomes 200° C. or less approximately as an adequate range which can develop the methanation reaction of carbon monoxide without developing the side reaction, the temperature control of hydrogen gas becomes easy. The form of the noble metal catalyst can preferably be turned into fine particulate shapes, and, as for the particle diameters in this instance, they can preferably be from 1 nm to 100 nm approximately.

The carbon monoxide removing catalyst of the present embodiment mode is such that, as the initial performance, it is possible to exemplify one which can reduce a carbon monoxide gas whose concentration is 1% to less than 0.1%, more preferably to less than 0.05%, at a processing temperature of 200° C. or less. When the processing temperature is adapted to 200° C. or less, the side reaction is suppressed, and not only the refining of hydrogen gas can develop efficiently but also the control of reaction becomes easy.

Carbon Monoxide Removing Catalyst: Second Mode

The carbon monoxide removing catalyst of the present embodiment mode not only possesses the above-described constitution but also is one which can be produced by a production process which is described in a production process for a carbon monoxide removing catalyst as hereinafter set forth. Therefore, regarding the respective descriptions, since they become duplicate, their further detailed descriptions are omitted.

Production Process for Carbon Monoxide Removing Catalyst

A production process of the present embodiment mode for a carbon monoxide removing catalyst is a production process for a carbon monoxide removing catalyst (for example, the carbon monoxide removing catalyst of the above-described first or second mode) which can remove carbon monoxide by means of carbon monoxide methanation reaction.

It is characterized in that it comprises: a precursor adhesion step of adhering a precursor of the noble metal catalyst selected from the group consisting of Ru, Pt, Rh and Pd onto said oxide support; and a reduction step of reducing said precursor into a metallic state.

As for a precursor of the noble metal catalyst, it can be one being capable of taking forms which contain the noble metal catalyst, such as a salt or alkoxide of the noble metal catalyst (in the states of oxide, and the like) and which are likely to be adhered onto the oxide support (for instance, it is liquid by itself, and is solved in a certain solvent to be solution-like, and so forth).

As for a method of adhering a precursor onto the oxide support, it is possible to exemplify a method in which the oxide support is immersed into a liquid including a precursor (or composed of a precursor), and a method in which the oxide support is impregnated with a liquid including a precursor (or composed of a precursor).

As for a salt of the noble metal catalyst, it is possible to employ those which are described in the carbon monoxide removing catalyst of the above-described first mode as they are, and it is possible to employ them as an aqueous solution, and the like, for the present step.

A method of reducing a precursor of the noble metal catalyst to the noble metal catalyst is not limited in particular, however, it can be done by subjecting it to heating, or the like, in a reducing atmosphere, such as in a hydrogen gas. In the instance of employing the form of an aqueous solution when adhering a precursor, it is possible as well to remove the water, which has been adhered simultaneously, by means of evaporation, and so forth, before the reduction step.

Here, a number-of-atom ratio (Co/Zr) of Co to Zr is such that the numeric ranges, set forth in the above-described carbon monoxide removing catalyst, can be employed as preferable ranges.

Carbon Monoxide Removing Apparatus

A carbon monoxide removing apparatus of the present embodiment mode comprises the aforementioned carbon monoxide removing catalyst. The carbon monoxide removing apparatus of the present embodiment mode can be used as an apparatus for removing carbon monoxide, which remains slightly after carbon monoxide is removed from a hydrogen gas, which has been produced after modifying amethane gas or methanol, by means of carbon monoxide shift reaction. In particular, it is suitable as an apparatus for removing carbon monoxide, which remains slightly (in an amount of from hundreds to thousands ppm approximately). Since the present apparatus facilitates the carbon monoxide methanation reaction, it is not needed to actively add water or oxygen with respect to hydrogen to be introduced into the present apparatus, moreover, since it is not needed to pressurize it like membrane reactors, such an advantage is available that an auxiliary machine for introducing water or oxygen becomes unnecessary. Although the generating methane is also supplied to the fuel electrode of fuel cells, it does not give any great influence to the cell reaction. Moreover, the generating methane is exhausted into an exhaust gas, which is exhausted from the fuel electrode of a fuel cell, and thereafter can be collected in a reformer along with remaining hydrogen, or can be re-utilized as part of the fuel at a burner, and the like, in a reformer, and so forth.

The temperature of hydrogen gas introduced into the present apparatus is such that, as for the lower limit, it is possible to name 100° C. or more, and more than 100° C., as a preferable value. As for the upper limit, it is served for the reaction at a temperature of 200° C. or less, preferably 175° C. or less, further preferably 150° C. or less. These upper limits and lower limits are combinable arbitrarily.

In order to let the activity of the used carbon monoxide removing catalyst demonstrate sufficiently, it can preferably comprise temperature controlling means for controlling the temperature of the carbon monoxide removing catalyst in the above-described set-up predetermined temperature range. As for temperature controlling means, it is possible to employ heat which is generated by means of methanation reaction by the carbon monoxide removing catalyst of the present embodiment mode, a method of utilizing heat which is generated by means of reaction generating hydrogen gas, or a method of certain heating/cooling from the outside.

The carbon monoxide in hydrogen gas reacts with hydrogen so that methane and water generate. The carbon monoxide removing catalyst removes carbon monoxide mainly by means of carbon monoxide methanation reaction. Further, the carbon monoxide shift reaction is developed by the generating water, and accordingly it is possible to remove carbon monoxide more effectively.

Carbon Monoxide Removing Method

A carbon monoxide removing method of the present embodiment mode is a method which uses the aforementioned carbon monoxide removing catalyst to remove carbon monoxide by means of methanation reaction. The carbon monoxide removing method of the present embodiment mode can be used as a method for removing carbon monoxide, which remains slightly after carbon monoxide is removed from a hydrogen gas, which has been produced after modifying a methane gas or methanol, by means of carbon monoxide shift reaction. In particular, it is suitable as an apparatus for removing carbon monoxide, which remains slightly (in an amount of from hundreds to thousands ppm approximately).

Since the present method utilizes the carbon monoxide methanation reaction, it is not needed to actively add water or oxygen with respect to hydrogen from which carbon monoxide is removed in the present method, such an advantage is available that an auxiliary machine for introducing water or oxygen becomes unnecessary. Although the generating methane is also supplied to the fuel electrode of fuel cells, it does not give any great influence to the cell reaction. Moreover, the generating methane is exhausted into an exhaust gas, which is exhausted from the fuel electrode of a fuel cell, and thereafter can be collected in a reformer along with remaining hydrogen, or can be re-utilized as part of the fuel at a burner, and the like, in a reformer, and so forth.

A hydrogen gas processed by the present method can be served for the reaction at 100° C. or more and 200° C. or less approximately, preferably 100° C. or more and 175° C. or less approximately, more preferably 100° C. or more and 160° C. or less approximately. The carbon monoxide in hydrogen gas reacts with hydrogen so that methane and water generate. The carbon monoxide removing catalyst removes carbon monoxide mainly by means of carbon monoxide methanation reaction. Further, the carbon monoxide shift reaction is developed by the generating water, and accordingly it is possible to remove carbon monoxide more effectively. Moreover, the carbon monoxide shift reaction is facilitated by actively humidifying it, and consequently it is possible to remove carbon monoxide furthermore effectively.

EXAMPLES

The present invention will be described using the following examples, however, it is needless to say that the present invention is not one which is limited to the following examples.

Production of Catalyst: See FIG. 1

Example No. 1

Number-of-Atom Ratio Zr:Co=3:1

Production of Oxide Support: As an alkaline solution, an NaOH aqueous solution (0.194 mol/L) was made, and was labeled a solution A (as for the alkaline solution, one in which the other alkaline compound (such as $Na_2CO_3$) is dissolved can be employed as well). Using cobalt (2) nitrate hexahydrate ($Co(NO_3)_2 \cdot 6H_2O$), a solution B whose Co concentration was 0.165 mol/L was made. Further, using oxyzirconium nitrate ($ZrO(NO_3)_2 \cdot 2H_2O$), a solution C whose Zr concentration was 0.5 mol/L was made. Next, solution D was made by mixing the solution B and solution C in a proportion of 1:1 by volume ratio. Thereafter, while stirring the solution A, the solution D was added slowly into the solution A, after adding the total amount, it was heat aged at 75° C. for 2 hours while stirring it. After aging, this solution was filtered and washed, and, after drying the precipitated cake, it was calcined at 450° C. for 3 hours, thereby obtaining an oxide. The molar ratio (number-of-atom ratio) of the obtained oxide is Co:Zr=1:3. The obtained oxide was granulated to a particle diameter of from 0.25 mm to 0.5 mm to adapt it to an oxide support.

Loading of Noble Metal Catalyst: Using ruthenium chloride hydrate ($RuCl_3 \cdot xH_2O$: containing Ru in an amount of 38.66% by mass), a ruthenium chloride aqueous solution was obtained. The granulated aforementioned oxide support was immersed into this aqueous solution, and, after evaporating the water, it was reduced at 400° C. for 2 hours in a mixture gas of hydrogen and helium, thereby obtaining an Ru/Zr—Co catalyst which contained Ru element in an amount of 1% by mass (the sum of the oxide support and noble metal catalyst being the basis). The obtained sample was labeled a test catalyst of the present example.

Comparative Example No. 1 ($ZrO_2$): except that an aqueous solution which did not contain Co nitrate but included oxyzirconium nitrate in an amount of 0.665 mol/L was labeled a solution D, a catalyst, which was prepared in the same manner as Example No. 1, was labeled a test catalyst of the present comparative example.

Comparative Example No. 2 (number-of-atom ratio Co:Mn=1:2): except that an aqueous solution which included Co nitrate in an amount of 0.222 mol/L was labeled a solution B, and that an aqueous solution which included Mn nitrate ($Mn(NO_3)_2 \cdot 6H_2O$) in an amount of 0.444 mol/L was labeled a solution C to use, a catalyst, which was prepared in the same manner as Example No. 1, was labeled a test catalyst of the present comparative example.

Comparative Example No. 3 (number-of-atom ratio Zr:Fe=3:1): except that an aqueous solution which included Fe nitrate ($Fe(NO_3)_3 \cdot 9H_2O$) in an amount of 0.165 mol/L was labeled a solution B to use, a catalyst, which was prepared in the same manner as Example No. 1, was labeled a test catalyst of the present comparative example.

Comparative Example No. 4 (number-of-atom ratio Zr:Mn=3:1): except that an aqueous solution which included Mn nitrate in an amount of 0.165 mol/L was labeled a solution B to use, a catalyst, which was prepared in the same manner as Example No. 1, was labeled a test catalyst of the present comparative example.

Carbon Monoxide Removing Test

Into a glass U-shaped tube whose inside diameter was 8 mm, the test catalysts of the respective example and comparative examples were filled (3 cm). Based on the upstream-side temperature of the catalysts, the catalyst temperatures were controlled. The composition and conditions of gas to be flowed into the catalysts were adapted so that the dry gaseous components other than water vapor were such that carbon monoxide was 1 dry %, carbon dioxide was 20 dry %, methane was 2 dry %, and the balance is hydrogen; water vapor was added to the dry gas so that S/G (a ratio of the mol flow volume of water vapor with respect to the mol flow volume of the dry gas) became 0.5; and the gas flow volume was 120 mL·m and GHSV (Dry) was 3,600 $hr^{-1}$.

The carbon monoxide concentration and methane concentration at the inlet and outlet of the glass U-shaped tube were measured. The gases at the inlet and outlet were measured by means of gas chromatography (GC). The conditions of GC were such that, using unibeads C as the column, the column temperature was increased from 50° C. to 220° C. at a rate of 20° C./min. to carry out the analysis. The detector was such that, using TCD, the TCD temperature was adapted to 120° C. and the TCD current was adapted to 100 mA. When the carbon monoxide concentration was the detection limit value of GC or less, the carbon monoxide concentration was measured using a carbon monoxide meter. The carbon monoxide meter was such that the zero point was adjusted with a high-purity nitrogen gas and the span was adjusted using carbon monoxide/nitrogen (99.37 ppm) as the calibration gas. For every experiment, the zero-point calibration and span calibration were carried out. At the respective temperatures, a carbon monoxide conversion ratio (=(Inlet CO Concentration−Outlet CO Concentration)÷(Inlet CO Concentration)×100(%)), and a methane generation ratio (=(Outlet $CH_4$ Concentration−Inlet $CH_4$ Concentration)÷(Inlet CH4 Concentration)×100(%)), and a carbon dioxide concentration were measured to calculate them. The measurement results of the carbon monoxide conversion ratio are set forth in Table 1. Note that the registries for Example Nos. 1 and 2 and Comparative Example Nos. 2 through 4 in Tables 1 and 3 specify to employ the oxides including the registered elements as the oxide support, respectively (for example, "ZrCO" of Example No. 1 means an oxide containing Zr and Co).

TABLE 1

| | Oxide Support | Upper Line: Carbon Monoxide Conversion Ratio (%) Lower Line: $CH_4$ Generation Ratio (%) | | | |
| --- | --- | --- | --- | --- | --- |
| | | 150° C. | 175° C. | 200° C. | 225° C. |
| Example No. 1 | ZrCO | 9.92 0 | 31.95 3.07 | 99.54 40.14 | 98.47 158.85 |
| Comp. Example No. 1 | $ZrO_2$ | 5.66 0 | 9.33 1.6 | 25.66 13.2 | 95.52 48.65 |
| Comp. Example No. 2 | CoMn | 14.95 0 | 44.23 2.43 | 86.24 32.99 | 90.77 37.42 |
| Comp. Example No. 3 | ZrFe | 9.25 0 | 10.31 0 | 17.47 0 | 48.72 10.1 |
| Comp. Example No. 4 | ZrMn | 8.28 0 | 9.61 0.4 | 20.87 3.74 | 94.83 45.89 |

It is apparent from Table 1 that, compared with Comparative Example No. 1 employing the oxide support of independent zirconia, the test catalysts of Example No. 1 and Comparative Example Nos. 3 and 4 into which the oxides of Co, Fe and Mn were introduced exhibited a higher carbon monoxide conversion ratio at 175° C. or less. In particular, it is understood that, whereas the test catalyst of Comparative Example Nos. 3 and 4 were such that the carbon monoxide conversion ratios degraded less than zirconia at 200° C., the test catalyst of Example No. 1 into which Co was introduced exhibited a high value.

Specifically, it is understood that the catalytic activity of the test catalyst of Example No. 1, which used the oxide support containing Zr and Co, at low temperatures, was higher, compared with the test catalysts of the comparative examples. The test catalyst of Example No. 1 is such that, although the carbon monoxide conversion at 175° C. or less was not equivalent to the test catalyst of Comparative Example No. 2, which used CoMn, but the carbon monoxide conversion ratio became 99.54% at 200° C., and accordingly could remove carbon monoxide substantially completely at low temperatures. It is possible to assume that the reversing of the carbon monoxide conversion ratios of Example No. 1 and Comparative Example No. 2 at 200° C. or more results from the fact that the test catalyst of Comparative Example No. 2 is such that the carbon shift reaction was predominant. That is, the carbon monoxide removing mechanism by the test catalyst of Comparative Example No. 2 is believed to be such that the carbon monoxide shift reaction is more predominant than the methanation reaction, and it is possible to assume that the carbon monoxide conversion ratio degraded at 225° C. or more because of the fact that the carbon monoxide shift reaction reached equilibrium. This is supported from the results of the methane generation ratio as well. That is, from the fact that, whereas the test catalyst of Example No. 1 is such that the methane generation ratio was high even in every temperature region so that the carbon monoxide methanation reaction developed, the methane generation ratio was low at 200° C. or more in the test catalyst of Comparative Example No. 2, it is apparent that the carbon monoxide shift reaction was predominant.

And, although details are not set forth herein, according to the measurement results of the inlet carbon dioxide concentration and outlet carbon dioxide concentration, in the test catalyst of Example No. 1, there was no difference between them in the testing temperature range in the present test, and accordingly it is understood that the methanation reaction in carbon dioxide did not develop.

Comparative Example Nos. 5 and 6

A catalyst in which Ru was loaded in an amount of 3% by mass (the entire mass being the basis) with respect to the oxide support (zirconia) of Comparative Example No. 1 was labeled a test catalyst of Comparative Example No. 5. Moreover, a catalyst in which Ru was loaded in an amount of 3% by mass and Co was loaded in an amount of 3% by mass (the entire mass being the basis, respectively) was labeled a test catalyst of Comparative Example No. 6. The respective carbon monoxide conversion ratios were measured. The results are set forth in Table 2. In Table 2, the results of Example No. 1 and Comparative Example No. 1 are also set forth along therewith.

TABLE 2

| | Oxide Support | Catalyst | Carbon Monoxide Conversion Ratio (%) | | | |
| --- | --- | --- | --- | --- | --- | --- |
| | | | 150° C. | 175° C. | 200° C. | 225° C. |
| Example No. 1 | ZrCo | Ru 1% | 9.92 | 31.95 | 99.54 | 98.47 |
| Comp. Example No. 1 | $ZrO_2$ | Ru 1% | 5.66 | 9.33 | 25.66 | 95.52 |
| Comp. Example No. 5 | $ZrO_2$ | Ru 3% | 16.32 | 34.31 | 100 | 100 |
| Comp. Example No. 6 | $ZrO_2$ | Ru 3%, Co 3% | 8.3 | 15.37 | 35.83 | 81.91 |

As can be apparent from Table 2, it is understood that, whereas the carbon monoxide conversion ratio improved at the respective temperatures in Comparative Example No. 5 in which the loading amount of noble metal catalyst was increased (1%∴3%), the carbon monoxide conversion ratio degraded in Comparative Example No. 6 whose loading amount of noble metal catalyst was the same and in which Co was further loaded. Therefore, when forming an oxide support composed of Co and Zr, it is understood that it is preferable to oxidize both of them simultaneously.

Note that it is possible to assume that, in Comparative Example No. 6, Co, which was loaded later, is such that the majority existed as oxide, however, it is possible to believe that it was reduced to metal partially in the reduction treatment after loading the catalysts and was alloyed with Ru, and accordingly it is possible to believe the possibility as well that the catalytic activity of Ru was degraded by alloying.

Example No. 2

Except that the loading amount of Ru was adapted to 5% by mass, a catalyst was produced in the same manner as Example No. 1, and was labeled a test catalyst of the present example.

Comparative Example No. 7

Except that the loading amount of Ru was adapted to 5% by mass, a catalyst was produced in the same manner as Comparative Example No. 1, and was labeled a test catalyst of the present comparative example.

Regarding the test catalysts of Example Nos. 1 and 2 as well as Comparative Example No. 7, the results of measuring the carbon monoxide conversion ratio and methane generation ratio are set forth in Table 3.

TABLE 3

| | Oxide Support | Catalyst (Ru) Loading Amount (%) | Upper Line: Carbon Monoxide Conversion Ratio (%) Lower Line: $CH_4$ Generation Ratio (%) | | |
| --- | --- | --- | --- | --- | --- |
| | | | 150° C. | 175° C. | 200° C. |
| Example No. 1 | ZrCo | 1 | 9.92 | 31.95 | 99.54 |
| | | | 0 | 3.07 | 40.14 |
| Example No. 2 | ZrCo | 5 | 39.46 | 100 | 100 |
| | | | 3.46 | 25.13 | 43.76 |
| Comp. | $ZrO_2$ | 5 | 30.29 | 77.95 | 100 |

TABLE 3-continued

| Oxide Support | Catalyst (Ru) Loading Amount (%) | Upper Line: Carbon Monoxide Conversion Ratio (%) Lower Line: CH₄ Generation Ratio (%) | | |
|---|---|---|---|---|
| | | 150° C. | 175° C. | 200° C. |
| Example No. 7 | | 3.18 | 19.99 | 51.28 |

By adapting the loading amount of Ru from 1% by mass (Example No. 1) to 5% by mass (Example No. 2), both carbon monoxide conversion ratio and methane generation ratio exhibited high values, in particular, the carbon conversion ratio reached 100% at 175° C. Moreover, even when the Ru loading amount was the same, the values of the carbon monoxide conversion ratio improved at low temperatures in comparison with Comparative Example No. 7 which used zirconia as the oxide support.

On Ratio of Zr to Co

Regarding the ratio of Zr to Co, an adequate range was searched.

Example No. 3

Number-of-Atom Ratio Zr:Co=3:1

Except that Ru (NO₃)₃ was used as an Ru salt instead of RuCl₃, and except that the calcination temperature was adapted to 400° C., a carbon monoxide removing catalyst, in which Ru as a noble metal catalyst was loaded in an amount of 1% by mass on an oxide support whose number-of-atm ratio was adapted to Zr:Co=3:1, was prepared employing a process being substantially the same as the process of Example No. 1, and was labeled a test sample of the present example.

Example No. 4

Number-of-Atom Ratio Zr:Co=3:2

Except that the mixing ratio of the solutions including Zr and Co was changed so that the number-of-atom ratio was adapted to 3:2, a carbon monoxide removing catalyst, which employed an oxide support whose number-of-atom ratio was adapted to Zr:Co=3:2, was prepared employing the substantially the same process as the process of Example No. 3.

Example No. 5

Number-of-Atom Ratio Zr:Co=3:4

Except that the mixing ratio of the solutions including Zr and Co was changed so that the number-of-atom ratio was adapted to 3:4, a carbon monoxide removing catalyst, which employed an oxide support whose number-of-atom ratio was adapted to Zr:Co=3:4, was prepared employing a process being substantially the same as the process of Example No. 3.

Example No. 6

Number-of-Atom Ratio Zr:Co=3:6

Except that the mixing ratio of the solutions including Zr and Co was changed so that the number-of-atom ratio was adapted to 3:6, a carbon monoxide removing catalyst, which employed an oxide support whose number-of-atom ratio was adapted to Zr:Co=3:6, was prepared employing a process being substantially the same as the process of Example No. 3.

Example No. 7

Number-of-Atom Ratio Zr:Co=3:9

Except that the mixing ratio of the solutions including Zr and Co was changed so that the number-of-atom ratio was adapted to 3:9, a carbon monoxide removing catalyst, which employed an oxide support whose number-of-atom ratio was adapted to Zr:Co=3:9, was prepared employing a process being substantially the same as the process of Example No. 3.

Test

By the same test as the above-described carbon monoxide removing test, the catalytic activities at 150° C., 175° C. and 200° C. were measured. The measurement results of the carbon monoxide conversion rate are set forth in Table 4.

TABLE 4

| | Number-of-Atom Ratio (Zr:Co) | | Upper Line: Carbon Monoxide Conversion Ratio (%) Lower Line: CH₄ Generation Ratio (%) | | |
|---|---|---|---|---|---|
| | Zr | Co | 150° C. | 175° C. | 200° C. |
| Example No. 3 | 3 | 1 | 7.63 0.64 | 23.79 8.87 | 94.58 65.07 |
| Example No. 4 | 3 | 2 | 8.81 0.51 | 18.05 1.34 | 93.08 39.79 |
| Example No. 5 | 3 | 4 | 11.19 0 | 31.61 1.88 | 93.82 59.37 |
| Example No. 6 | 3 | 6 | 10.98 3.22 | 46.9 9.23 | 94.01 109.72 |
| Example No. 7 | 3 | 9 | 6.88 0.42 | 29.12 7.53 | 37.62 10.44 |

As can be apparent from Table 4, it is understood that a high carbon monoxide conversion ratio was exhibited even at a low temperature of 200° C. or less by optimizing the number-of-atom ratio of Zr to Co, the constituent components of the oxide support. For example, when paying attention to the column in which the processing temperature is 175° C., it is understood that the carbon monoxide removing catalysts of Example Nos. 5 and 6 whose values of Zr:Co were 3:4 and 3:6 exhibited higher carbon monoxide conversion ratios. In particular, it is understood that the carbon monoxide conversion ratio of the carbon monoxide removing catalyst of Example No. 6 whose value of Zr:Co was 3:6 was the best under the present experimental conditions.

The invention claimed is:
1. A carbon monoxide removing catalyst, comprising:
an oxide support composed of an oxide containing Co and Zr; and a noble metal catalyst selected from the group consisting of Ru, Pt, Rh and Pd, and loaded on the oxide support; and wherein the carbon monoxide removing catalyst is capable of removing carbon monoxide present in a hydrogen gas by a carbon monoxide methanation reaction, and wherein a number-of-atom ratio (Co/Zr) of Co to Zr is 1/20 or more and 1/0.05 or less.

2. A carbon monoxide removing catalyst, comprising:

an oxide support composed of an oxide containing Co and Zr; and a noble metal catalyst selected from the group consisting of Ru, Pt, Rh and Pd, and loaded on the oxide support; and wherein the carbon monoxide removing catalyst is capable of removing carbon monoxide present in a hydrogen gas by a carbon monoxide methanation reaction, and wherein a number-of-atom ratio (Co/Zr) of Co to Zr is 1/3 or more and 3/1 or less.

3. A carbon monoxide removing catalyst, comprising:

an oxide support composed of an oxide containing Co and Zr; and a noble metal catalyst selected from the group consisting of Ru, Pt, Rh and Pd, and loaded on the oxide support; and wherein the carbon monoxide removing catalyst is capable of removing carbon monoxide present in a hydrogen gas by a carbon monoxide methanation reaction, and wherein a number-of-atom ratio (Co/Zr) of Co to Zr is 4/3 or more and 2/1 or less.

* * * * *